United States Patent
Lowman et al.

(10) Patent No.: US 7,267,267 B2
(45) Date of Patent: Sep. 11, 2007

(54) SYSTEM AND METHOD FOR PROVIDING SIGNAL COMPATIBILITY

(75) Inventors: Thomas Richard Lowman, Liberty, MO (US); Robin Dua, Vienna, VA (US); Ron Henry Pinkus, Fairfax, VA (US)

(73) Assignee: ExxonMobil Research & Engineering Company, Fairfax, VA (US)

( * ) Notice: Subject to any disclaimer, the term of this patent is extended or adjusted under 35 U.S.C. 154(b) by 307 days.

(21) Appl. No.: 10/911,568

(22) Filed: Aug. 5, 2004

(65) Prior Publication Data
US 2005/0067488 A1    Mar. 31, 2005

Related U.S. Application Data

(60) Provisional application No. 60/492,982, filed on Aug. 7, 2003.

(51) Int. Cl.
*G06K 5/00* (2006.01)
(52) U.S. Cl. ....................... 235/380; 235/493
(58) Field of Classification Search ........... 235/380, 235/382, 375, 379, 382.5; 705/64, 79
See application file for complete search history.

(56) References Cited

U.S. PATENT DOCUMENTS

| | | | | |
|---|---|---|---|---|
| 6,720,866 B1 * | 4/2004 | Sorrells et al. | ............ | 340/10.4 |
| 6,809,952 B2 * | 10/2004 | Masui | ............ | 365/145 |
| 7,070,112 B2 * | 7/2006 | Beenau et al. | ............ | 235/488 |
| 2002/0131567 A1 * | 9/2002 | Maginas | ............ | 379/91.01 |
| 2004/0118930 A1 * | 6/2004 | Berardi et al. | ............ | 235/492 |
| 2004/0260646 A1 * | 12/2004 | Berardi et al. | ............ | 705/39 |

FOREIGN PATENT DOCUMENTS

| | | |
|---|---|---|
| WO | WO96/24112 | 8/1996 |
| WO | WO97/46964 | 12/1997 |
| WO | WO 03/007623 A2 | 1/2003 |

* cited by examiner

*Primary Examiner*—Thien Minh Le
(74) *Attorney, Agent, or Firm*—Hunton & Williams LLP

(57) ABSTRACT

The present disclosure provides methods and systems for transforming characters stored in a fixed format into an alternate format or template with which the fixed format would otherwise be incompatible. In particular, methods and systems are disclosed for reading a customer identification (CID) number from a radio frequency identification device (RFID) and processing the CID number into a format that is compatible with an otherwise incompatible standard, template, sequence, or combination thereof.

20 Claims, 3 Drawing Sheets

SYSTEM AND METHOD FOR PROVIDING SIGNAL COMPATIBILITY

The present invention claims priority to U.S. Provisional Application No. 60/492,982, filed Aug. 7, 2003, the contents of which are incorporated herein by reference in their entirety.

BACKGROUND OF THE INVENTION

1. Field of the Invention

The present disclosure provides methods and systems for transforming characters stored in a fixed format into an alternate format or template with which the fixed format would otherwise be incompatible. In particular, methods and systems are disclosed for reading a customer identification (CID) number from a radio frequency identification device (RFID) and processing the CID number into a format that is compatible with an otherwise incompatible standard, template, sequence, or combination thereof.

2. Description of Related Art

The traditional credit card comprises a magnetic stripe on the back of the credit card. This magnetic stripe generally contains three "tracks" of data and information that are stored in the magnetic stripe. Each track is 0.110 inches wide. The standard format for the data in the magnetic stripe is detailed in sources such as International Standard ISO/IEC 7813, $5^{th}$ ed., 2001 May 01 (Reference No. ISO/IEC 7813:2001(E)).

With reference to FIG. 1, track 1 is a "track" of information on a credit card magstripe that has a 79 six-bit plus parity bit read only characters. Normally, a primary account number (up to 19 characters—designated on FIG. 1 as data A), a country code (3 characters) and a name (2-26 characters) (collectively, data B), and an expiration date (4 characters) and discretionary data (collectively, data C) are contained on track 1. Track 2 is typically a "track" of information on a credit card magstripe that has a 40 four-bit plus parity bit characters. Normally, a primary account number (up to 19 characters—data D), a country code (3 characters), an expiration date (4 characters) and discretionary data (collectively, data E) are contained on track 2. Track 3 is a "track" of information on a credit card magstripe that has a 107 four-bit plus parity bit characters. Normally, track 3 is a read/write track that can include an encrypted personal identification number (PIN), country code, currency units, authorized amount and additional information (arranged in some fashion as data F and data G). Typically, credit card processing uses only tracks 1 and 2 as the usage of track 3 has not been standardized in the credit card industry. In addition, each track may also contain start sentinels (SS) and end sentinels (ES), format codes (FC), field separators (FS), and longitudinal redundancy check (LRC) characters.

The above described magnetic stripe technology is well known in the current art and publications. For example, in addition to the above ISO/IEC standard, the website accessible at http://www.howstuffworks.com/question503.htm, presents an overview of magnetic stripe technology and the track 1 and track 2 standards and sequences.

When a credit card is used as payment by a consumer to a merchant, the credit card is passed through a device (a reader) that reads the magnetic stripe on a credit card for account information to automatically be processed for a transaction. Typically, a credit card reader is either integrated into a register, attached onto a register as a separate component or is part of a stand-alone terminal dedicated for the function of processing credit card transactions.

Contactless cards, key fobs, and other form factors, have been shown to be preferred over the normal magnetic stripe cards. First, contactless devices are more resistant to wear-and-tear due to use and are not subject to magnetic interference of the stored information. Second, some are of the opinion that contactless devices are less likely to be misread. Third, contactless devices are, or at least are perceived by the consumer to be, faster than a normal magnetic stripe transaction. Finally, in general, a consumer can perform the contactless device transaction themselves, thus eliminating giving possession of their credit card to a merchant employee.

Contactless cards have recently been introduced by several credit card issuers for use by consumers. These contactless credit cards generally contain an on-card circuit chip and a magnetic stripe. The chip contains track 1 and track 2 data that is virtually identical to the data on the magnetic stripe (i.e., cardholder name, card number, expiration date, etc.). Typically, a radio frequency-based reader that is capable of reading the chip is attached to an existing, already-in-use magnetic stripe reader that is associated with a point of sale (POS) terminal or system. The radio frequency-based reader reads the track 1 and track 2 magnetic stripe data from the chip and communicates the data to the POS terminal. Typically, the track 1 and track 2 data stored on the chip is in the same format and sequence as track 1 and track 2 data stored on a magnetic stripe. Therefore, the POS terminal is able to process the data as it would a traditional magnetic stripe credit card transaction. Accordingly, other than the addition of a radio frequency-based reader, minimal changes may be required to the POS terminal or system in order for the contactless credit card to be utilized with the existing, already-in-use POS terminal or system.

Despite providing the above-mentioned benefits and advantages of a contactless transactions, these contactless credit cards have several disadvantages. For example, if the card is lost or stolen, the card must be replaced and the consumer is unable to utilize the card as a payment form until the card is replaced. Likewise, if the expiration date of the card expires, the entire card must be replaced and the consumer is unable to utilize the card until a replacement card is obtained.

The contactless credit card is also typically associated with a single method of payment. For example, a consumer may have a contactless credit card corresponding to a single account and serviced by a single credit processing network. Typically, such a contactless credit card can only be used in the corresponding credit processing network.

Contactless credit cards can also present security concerns. For example, if the chip embedded in the credit card is removed from the credit card by a thief, the chip may be used in fraudulent contactless credit card transactions by the thief. Further, in systems where the actual credit card number is transmitted wirelessly (in magstripe format) to the reader and utilized for the transaction, the credit card number could be intercepted by a thief and used in unauthorized transactions.

SUMMARY OF THE INVENTION

A number of these disadvantages and problems are mitigated by a transponder-based transaction system that associates information stored on the transponder with a method of payment. An example of such a system is the Speedpass® system, embodiments of which are disclosed in U.S. application Ser. No. 10/407,363, filed Apr. 4, 2004, U.S. application Ser. No. 10/083,249, filed Feb. 27, 2002 and U.S.

application Ser. No. 09/505,721, filed Feb. 17, 2000 which are herein incorporated by reference.

The herein disclosed systems and methods provide several advantages over the current and known transaction systems and solves the problems discussed above by, among other things, reading a CID code, that is not in track 1-3 format, from an RFID, converting the CID code into a track 1-3 format, and communicating the converted CID code to the POS terminal or system. In this manner, a consumer may employ a credit card based transaction that utilizes a CID code that is associated with their credit card number stored in a database, generally a remote database as described below. However, the actual credit card number is never transmitted in the "open" (and, therefore, is not capable of being intercepted by a thief).

Conversion of the CID code may be accomplished in any suitable manner. For example, all or parts of the herein described processing may be accomplished by processor(s) running program(s) resident at the reader, the POS terminal or system, a remotely located host processor system or some other processor device.

Another advantage is that the transponder and corresponding CID code are not locked to a specific method of payment. Therefore, if a consumer has a particular credit card associated with their transponder and corresponding customer identification code, and this particular credit card is lost, stolen, or expires, the consumer merely has to associate another method of payment with their transponder and the consumer may continue to utilize the transponder without waiting for the transponder to be replaced.

In addition, the consumer may link more than one source of payment to a transponder and corresponding CID code. For example, a consumer may specify that food purchased with the transponder is to be paid via electronic funds transfer (EFT) from a bank account and that gasoline purchased with the transponder is to be paid via an oil company (e.g., proprietary) credit card and that merchandise purchased at a department store is to be paid, first via loyalty program reward points, and the balance via credit card. Of course, other variations are also possible.

DETAILED DESCRIPTION OF PREFERRED EMBODIMENTS

Figure 1:
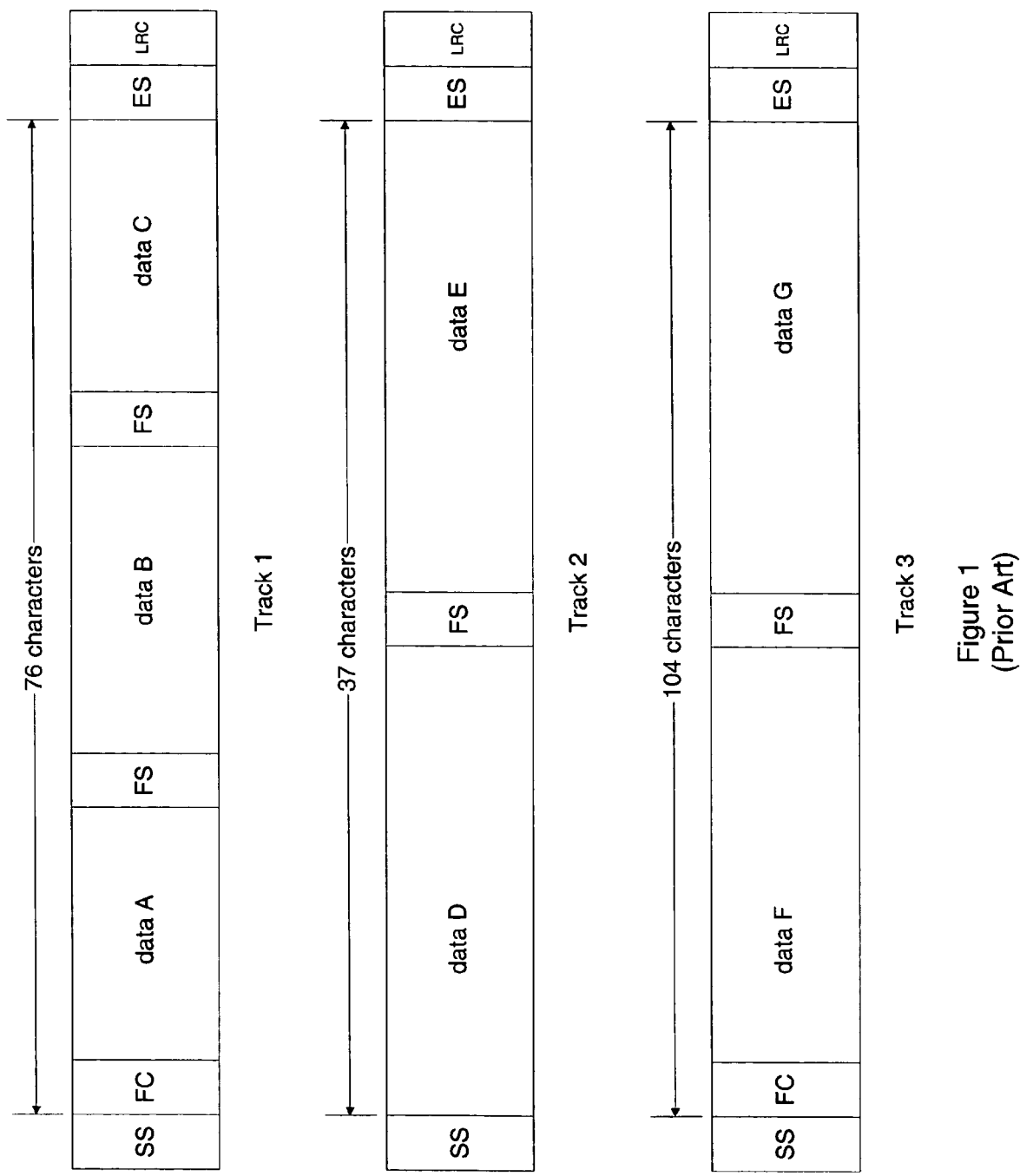
FIG. 1 is an exemplary schematic representation of the information tracks on a magnetic stripe in accordance with the prior art.

The detailed description that follows is represented largely in terms of processes and symbolic representations of operations performed by conventional computer components, including central processing units (CPU), memory storage devices for the CPU, and connected input and display devices. These operations include the manipulation of data bits by the CPU and the maintenance of these bits within data structures residing in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of processor or computer-executable steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to these signals as bits, values, elements, symbols, characters, terms, objects, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc., which are often associated with manual operations performed by a human operator. It is understood that no such involvement of a human operator is necessary or even desirable in the present invention. The operations described herein are machine operations performed in conjunction with human operator(s) or user(s) who interact with the computer(s). The machines used for performing the operation of the present invention include general digital computers or other similar processing devices.

In addition, it should be understood that the programs, processes, methods, etc., described herein are not related or limited to any particular computer or apparatus. Rather, various types of general purpose machines may be used with programs constructed in accordance with the teachings described herein. Similarly, it may prove advantageous to construct specialized apparatus to perform the methods described herein by way of dedicated computer systems with hard-wired logic or programs stored in nonvolatile memory, such as read only memory.

The operating environment in which the present invention is used may encompass general distributed computing systems wherein general purpose computers, workstations, personal computers, special purpose computers, POS devices, card readers, etc., are connected via communication links of various types. In embodiments employing a client-server arrangement, programs and data, many in the form of objects, are made available by various members of the system.

Figure 2:
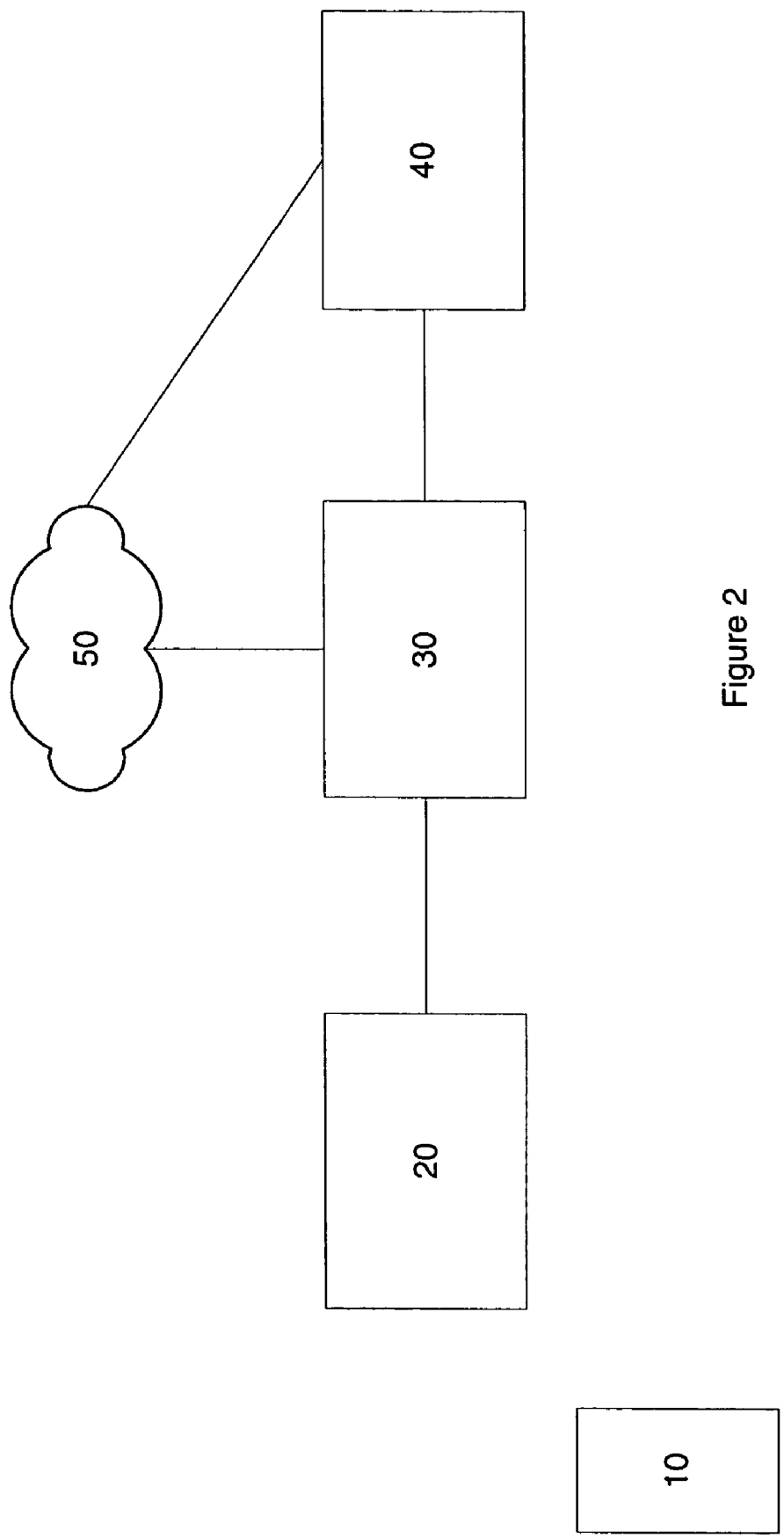
FIG. 2 is a schematic representation of some system components in accordance with some disclosed embodiments.

FIG. 2 is a schematic representation of some system components in accordance with some disclosed embodiments. As shown in FIG. 2, a transponder 10 may be used to transmit an RF signal that comprises a CID. The RF signal may be received by an appropriate receiver 20. A processing device (e.g., CPU) 30 may process the received signal to determine, among other things, the CID. Processor 30 may also comprise the routines to convert the CID into appropriate Track 1, 2 and 3 formats as described below. While receiver 20 and processor 30 are shown as separate items in FIG. 2, other configurations are possible. For example, receiver 20 and processor 30 may both comprise parts of a single POS terminal or system, or receiver 20 and processor 30 may be discrete devices that communicate with a POS terminal or system, or some other combination.

Processor 30 may also communicate with one or more networks 50. In addition, processor 30 may communicate with payment processing system 40. This communication may be direct (e.g., through a wired connection) or indirect (e.g., through a network). In addition, payment processing system 40 may include a host processor or similar device that enables various functionalities. For example, consumer payment preferences, account numbers, or other parameters may be stored at a remote host processor.

Figure 3:
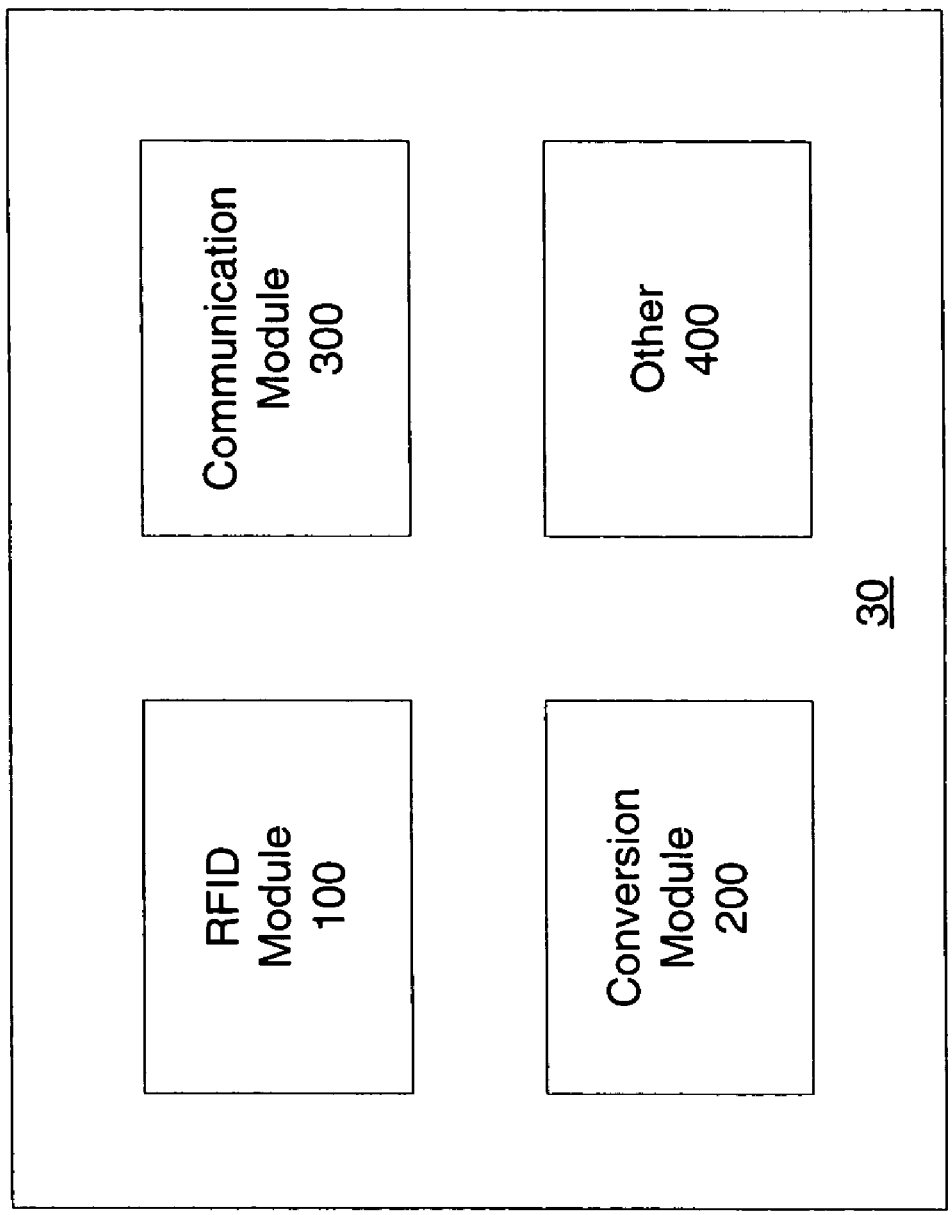
FIG. 3 is a schematic representation of some processor modules in accordance with some disclosed embodiments.

FIG. 3 is a schematic representation of some processor modules in accordance with some disclosed embodiments. As shown in FIG. 3, processor 30 may comprise several modules to carry out various processes. The modules may comprise software routines (e.g., programs), firmware routines, hardware components, or any other acceptable mechanism for performing processor based operations. In addition, while FIG. 3 shows a number of modules within processor 30, it is understood that all or parts of the modules may be distributed over other networked resources.

In some embodiments, processor 30 may comprise an RFID module 100, a conversion module 200, a communication module 300 and other modules 400. RFID module 100 may comprise the process instructions to process the received RF signal and extract the CID code and security data. Conversion module 200 may comprise the process instructions to convert the CID information to the appropriate magstripe track format as described below. Communication module 300 may comprise the process instructions to enable communication of the magstripe track formatted CID information to the POS terminal or system, host processor or payment processing network 40. Of course, processor 30 may also comprise other modules 400 for carrying out other processes.

One embodiment comprises taking unique CID codes stored in a transponder 10 and associated security data and converting them, via conversion module 200, into standard magnetic credit card track data format (e.g., as described in ISO 7813) for passing with transactions through existing POS systems, their host processors and associated processing networks using an intelligent reader device (e.g., processor 30) attached to the POS terminal or system or otherwise in communication with the payment processing network 40.

The converted CID and security data is communicated to the POS terminal or system or payment processing network 40 in the appropriate account number and discretionary data fields format for tracks 1 and 2. In some embodiments, processor 30 (via conversion module 200) may insert a Bank Identification Number (BIN) which is not part of the transponder 10 provided data. This BIN may be inserted in the account number field track data format to allow proper routing. In another embodiment, the BIN may be assigned to the issuer of the transponder or one allocated to the issuer by another third party network. BINs may be stored locally or remotely (e.g., in a host processor).

In another embodiment, transponder 10 CID numbers may consist of 11 to 20 digits. Optionally, conversion module 200 converts the data to the appropriate magstripe track format by splitting it between the account number (e.g., data A and data D) and the discretionary portions of the track data (e.g., data C and data E). In some embodiments, processor 30 may provide a check digit for the account number (e.g., a known checksum or other validity checking technique), an acceptable expiration date (e.g., a valid YYMM format, such as, MM is a value from 01 to 12) and service code data to facilitate common edits. In some embodiments, these common edits are those already in place in most POS systems and associated payment processing networks 40.

In another embodiment, the name field format (e.g., data B) for track 1 is used for including additional security or application data. Optionally, the security data utilizes an algorithm or encryption system to ensure device integrity. For example, in some embodiments, the security algorithm comprises a proprietary Texas Instrument Digital Signature Transponder algorithm. In most cases, the longer the BIN, the more the transponder 10 CID code is shifted into the discretionary data field (data C and data E) and the more compact the security data becomes. In another embodiment, the track 1 format is utilized and the equivalent track 2 data is included in addition to utilizing the standard 26 character "name" field for additional security and/or application data.

The following examples are provided to facilitate understanding of the conversion of CID information. In one example, transponder 10 CID code is eleven digits long and comprises the numeric string: 22222222222. The security and/or other application data is sixteen digits long and comprises the numeric string: 3333333333333333. The BIN is four digits long and comprises the numeric string: 1111. Once the RF signal is received and processed, as discussed above, conversion of the above information into appropriate magstripe format may result in a communicated account number (data A and data D) of 1111222222222220 (wherein the last digit of "0" comprises the check digit). The resulting discretionary data (data C and data E) comprises: YYMM3333333333333333. Thus, in this example, conversion module 200 converted the eleven digits of the CID code and the four digits of the BIN into a sixteen digit account number format (data A and data D). As shown above, the conversion may include steps to insure that the first digits of the account number format include the BIN, that the sixteenth digit equals a check sum digit for the account number (according to a predetermined check sum routine) and that the YYMM digits are a valid date (e.g., YY has not elapsed and MM is 01 to 12). This magstripe formatted string (including appropriate start and end sentinel, LRC and separator bits) may be communicated (e.g., via communication module 300), ultimately, to payment processing network 40 for appropriate handling in the same manner as a "swiped" magnetic stripe transaction.

In another example, transponder 10 CID code is eleven digits long and comprises the numeric string: 22222222222. The security and/or other application data is twelve digits long and comprises the numeric string: 333333333333. The BIN is eight digits long and comprises the numeric string: 11111111. Once the RF signal is received and processed, as discussed above, conversion of the above information into appropriate magstripe format may result in a communicated account number (data A and data D) of 1111111122222226 (wherein the last digit of "6" comprises the check digit). The resulting discretionary data (data C or data E) comprises: YYMM2222333333333333. Thus, in this example, conversion module 200 converted the seven of eleven digits of the CID code and the eight digits of the BIN into a fifteen digit account number plus the check digit format (data A and data D), with the remaining four digits of the CID code shifted into the discretionary data (data C or data E). As shown above, the conversion may include steps to insure that the first digits of the account number format include the BIN, that the last digit equals a check sum digit for the account number (according to a predetermined check sum routine) and that the YYMM digits are a valid date (e.g., YY has not elapsed and MM is 01 to 12). The digits in the discretionary data may be rearranged or modified to accommodate any specific POS edits encountered (e.g. expecting a specific service code following the expiration date, etc.).

As demonstrated by the above examples, the conversion module 200 may appropriately format the CID code and other information (e.g., security data, BIN, etc.) into the corresponding magstripe track format (e.g., track 1 or track 2 format). As also demonstrated above, the conversion may depend upon the number of characters present in the CID, BIN, security data and other factors (e.g., are first 4 digits of data C and data E in valid YYMM format, etc.). This magstripe formatted data may then be communicated to the POS terminal or system (or to the payment processing network 40) for appropriate handling.

While the above description has been primarily limited to credit cards, the claimed invention is not so limited. Any type of magstripe formatting may be implemented be it for credit cards, debit cards, combination credit/debit cards, or the like. Of course, different types of cards may require additional or fewer processing steps to accomplish conversion to the appropriate format. For example, debit cards may require additional processing steps to incorporate a PIN or other security mechanism.

Therefore, while the description herein is phrased in terms of a generic CID code, it is to be understood that the transponder 10 could transmit an encrypted credit card or debit card track 1, 2, and 3 data that was generated using a number of possible encryption techniques (e.g., RC2, RC4, DES, 3DES, Blowfish, AES, Public Key, etc.). The conversion process described in turn would decrypt the track 1, 2, and 3 card information and convert it into a standard format as found on the magnetic stripe itself. As such, encryption-decryption techniques may be used to mask this, and other, signals without departing from the claimed systems and methods. Likewise, other signal processing techniques, such as error check, may be incorporated into the disclosed systems and methods.

Similarly, while the above examples demonstrate conversion of a CID code, the claimed invention is not so limited. Transponder 10 may transmit various types of unique information for conversion to magstripe format. For example, the unique information may comprise a CID code, a credit card number encrypted using a number of possible encryption techniques (e.g., RC2, RC4, DES, 3DES, Blowfish, AES, Public Key, etc.), or some other unique identifier that is subsequently converted to magstripe format in a manner similar to that described above.

Although the present invention has been described in terms of particular embodiments, it is not limited to these embodiments. Alternative embodiments and modifications which would still be encompassed by the invention may be made by those skilled in the art, particularly in light of the foregoing teachings. Therefore, this invention is defined by the following claims and is intended to cover any alternative embodiments, modifications or equivalents which may be within the spirit and scope of the claimed invention.

What is claimed is:

1. A system for processing a contactless transaction, the system comprising:
   a receiver for receiving a radio frequency identification (RFID) signal;
   a processor for determining customer identification (CID) information from the received RFID signal;
   a conversion module for converting the CID information into a magnetic stripe track format by compiling one or more Bank Identification Numbers (BINs) with the CD information; and
   a communication module for communicating the converted CID information in the magnetic stripe track format to a payment processing network.

2. The system of claim 1, wherein the RFID signal does not include a credit card account number.

3. The system of claim 1 wherein the conversion module converts the CID information into credit card track 1 magnetic stripe format.

4. The system of claim 1 wherein the conversion module converts the CID information into credit card track 2 magnetic stripe format.

5. The system of claim 1 wherein the conversion module converts the CID information into credit card track 3 magnetic stripe format.

6. The system of claim 1 wherein the conversion module converts the CID information by compiling additional information with the CID information.

7. The system of claim 6 wherein the additional information is security information.

8. The system of claim 1 wherein the conversion module converts the CID information by including a check digit.

9. A method for processing a contactless transaction the method comprising:
   receiving a radio frequency identification (RFID) signal;
   determining customer identification (CID) information from the received RFID signal;
   converting the CID information into a magnetic stripe track format by compiling one or more Bank Identification Numbers (BINs) with the CID information; and
   communicating the converted CID information in the magnetic stripe track format to a payment processing network.

10. The method of claim 9, wherein the RFID signal does not include a credit card account number.

11. The method of claim 9 wherein the conversion of the CID information is a conversion into credit card track 1 magnetic stripe format.

12. The method of claim 9 wherein the conversion of the CID information is a conversion into credit card track 2 magnetic stripe format.

13. The method of claim 9 wherein the conversion of the CID information is a conversion into credit card track 3 magnetic stripe format.

14. The method of claim 9 wherein the conversion of the CID information further comprises compiling additional information with the CID information.

15. The method of claim 14 wherein the additional information is security information.

16. The method of claim 9 wherein the conversion of the CID information further comprises including a check digit.

17. A method for processing a contactless transaction the method comprising:
   receiving a radio frequency identification (RFID) signal;
   determining unique information from the received RFID signal;
   converting the unique information into a magnetic stripe track format by compiling one or more Bank Identification Numbers (BINs) with the CID information; and
   communicating the converted unique information in the magnetic stripe track format to a payment processing network.

18. The method of claim 17 wherein the converted unique information comprises a credit card number.

19. The method of claim 17 wherein the converted unique information comprises a debit card number.

20. A system for processing a contactless transaction the system comprising:

a receiver for receiving a radio frequency identification (RFID) signal;

a processor for determining unique information from the received RFID signal;

a conversion module for converting the unique information into a magnetic stripe track format by compiling one or more Bank Identification Numbers (BINs) with the CID information; and a communication module for communicating the converted unique information in the magnetic stripe track format to a payment processing network.

\* \* \* \* \*